United States Patent [19]

Gillberg

[11] Patent Number: 4,864,733
[45] Date of Patent: Sep. 12, 1989

[54] METHOD AND APPARATUS FOR TESTING OIL SEALS AND THE LIKE

[76] Inventor: Carl E. Gillberg, 5387 S. Perry St., Littleton, Colo. 80123

[21] Appl. No.: 155,234

[22] Filed: Feb. 12, 1988

[51] Int. Cl.$^4$ ................................................. G01B 5/08
[52] U.S. Cl. ...................................... 33/179; 33/178 E
[58] Field of Search ................. 33/178 R, 178 E, 179, 33/176; 364/560–564; 73/865.8

[56] References Cited

U.S. PATENT DOCUMENTS

| | | | |
|---|---|---|---|
| 1,943,278 | 1/1934 | Thompson et al. | 356/237 |
| 2,321,331 | 6/1943 | Sweezey | 356/237 |
| 2,441,343 | 5/1948 | Becker | 33/178 |
| 2,529,360 | 11/1950 | Welch . | |
| 2,637,909 | 5/1953 | Aubrey, Jr. et al. | 33/179 |
| 2,648,913 | 8/1953 | Mackenzie | 33/179 |
| 2,801,475 | 8/1957 | Meyer, Jr. | 33/179 |
| 2,895,226 | 7/1959 | Loy | 33/179 |
| 3,171,883 | 3/1965 | Jones . | |
| 3,185,023 | 5/1965 | Groth . | |
| 3,921,300 | 11/1975 | Lox et al. | 33/178 E |
| 4,447,959 | 5/1984 | Watanabe et al. | 33/178 E |
| 4,634,273 | 1/1987 | Farleman et al. | 356/237 |

*Primary Examiner*—Stewart J. Levy
*Assistant Examiner*—Robert R. Raevis

*Attorney, Agent, or Firm*—Gregory W. O'Connor; Edna M. O'Connor

[57] ABSTRACT

Among the many challenges in the manufacture of oil seal rings of elastomeric material is to create a seal whose sealing surface is within certain critical dimensions, usually in terms of a nominal diameter plus or minus a tolerance. There have been several methods available to test oil seals to determine the actual diamter of the sealing surface. These require considerable experience and training. Repeatability can be adversely affected by a number of factors. The subject invention includes an apparatus which combines a light box with a controllably expansible gauge band. The expansion of the band is monitored by an electronic position indicator. In operation, the seal to be tested is placed over the properly selected gauge band on the light box. The user adjusts the vernier to expand the band until a "light seal" is obtained, i.e., when any space between the smooth outer diameter of the band and the lip of the the seal is just closed. At that point, a reading of the position detector is taken. The reading can be in terms of the actual diameter determined by this test but more desirably as a deviation from the nominal diameter. The comformable nature of the band, combined with its operation wherein the circumference dimension is directly measured and the diameter determined from this dimension, makes the subject invention especially useful for measuring even oval portions of other components.

10 Claims, 3 Drawing Sheets

METHOD AND APPARATUS FOR TESTING OIL SEALS AND THE LIKE

BACKGROUND OF THE INVENTION

The manufacture of oil seal rings of elastomeric material is fraught with difficulties. Among the many challenges is to create a seal whose sealing surface is within certain critical dimensions, usually in terms of a nominal diameter plus or minus a tolerance, usually expressed in .001".

There have been several methods available to test oil seals to determine the actual diameter of the sealing surface. The simplest, but one that is quite time consuming, is the use of a gage shaft (also known as a "step pin") on which incremental steps of known diameters have been machined. A skilled operator can judge which of the stepped diameters most closely approximates the actual i.d. (inside diameter) of the seal somewhat by the "feel" of the shaft inserted in the oil seal being tested, sensing when there was just the right drag or resistance to sliding between step pin and the seal.

This "feel" test is sometimes supplimented by the use of a light box. In this procedure, the operator attempts to view the light box through any gap between the gage rod and the seal. This also checks for any nicks in the oil seal lip as well as the overall dimension of the seal.

These techniques require considerable experience and training. Repeatability is affected by a number of factors including the friction characteristics of the rubber compound used in the seal and whether the step pin or the seal lip were contaminated with lubricants, mold release compounds etc.

These methods are also cumbersome because of the need for supplying large numbers of the bulky step pins. Also, the pins necessarily have only a finite number of incremental diameters represented, and thus the precision of the test is limited to the closeness to which the nominal diameter of the seal can be approximately by the diameter of the closest available step on the gage rod.

Also, the subjective nature of the test limits its accuracy and repeatability.

Another known method includes the use of an optical gage that employs a microscope on a traverse to detect the inner edge of a seal. The diameter of the seal is determined by the precise measurement of the position of the microscope when the image of the edge is detected at a particular position in its field of view. Such instruments can include automatic feedback control devices to detect the image of the edge.

This method has the advantage that it does not contact the extremely flexible edge of the seal, which contact could deflect that edge and thus result in inaccurate measurements. However, repeatability is still a problem. Also, the sealing surface rarely presents a truly circular dimension, so a number of readings must be made in order to determine the i.d. by averaging these readings.

OBJECTS OF THE INVENTION

Thus, it is an object of the invention to provide an apparatus that can quickly and accurately determine the nominal diameter of a substantially circular sealing surface of an elastomeric oil seal, and to do so in a manner relatively free of the subjective aspects of the prior art testing and measuring systems.

It is another object of the invention to provide a system of measuring the circumference of the sealing surface of a packing gland or seal and to determine the nominal diameter from that measurement.

It is another object of the invention to provide a method of testing the knife edge sealing surface of an oil seal for nicks and the like while simultaneously determining whether the seal is sized within predetermined tolerances from a nominal dimension.

BRIEF DESCRIPTION OF THE INVENTION

Accordingly the instant invention provides for a device for testing the diameter of a member, and more particularly the sealing surface of a sealing member comprising, an adjustable band, a means for adjusting the effective circumference of this band, means for determining the amount of said adjustment, and means for signalling when the circumference of the adjustable band is equivalent to the circumference of the sealing surface being tested.

Also contemplated by the instant invention is a method of testing the sealing surface of a seal or packing gland, or measuring the diameter of a circular portion of a member, the method comprising, providing an adjustable circular band, placing the circumference of said band adjacent the sealing edge of a seal, modifying the circumference of said band, and signalling when said circumference of said band contacts the sealing edge or the circular portion.

The subject invention includes an apparatus which combines a light box with a variably expansible circular band. The expansion of the band is monitored by an electronic position indicator. In its operation, an expansible gage band having the general shape of a ring with a gap and pins positioned at the opposite side of the gap is selected which has an o.d. (outside diameter) equal to the nominal i.d. of the seal to be tested. The pins are slipped into vernier positionable jaws. The position of the jaws, and thus the effective diameter of the expansible band, is detected by a position detecting instrument of known type.

In operation, the seal to be tested is placed over the properly selected band on the light box. The user adjusts the vernier to expand the band until a "light seal" is obtained, i.e. when any gap between the smooth outer diameter of the band and the lip of the seal is just closed. At that point, a reading of the position detector is taken. The reading can be in terms of the actual diameter determined by this test, but more desirably as a deviation from the nominal diameter.

This method and apparatus has advantages over the prior art systems in that it is simpler, more repeatable, and is not subject to the biasing effects of other mechanical measuring systems caused by the varying deflection characteristics of seal lip configurations or rubber compounds.

DETAILED DESCRIPTON OF THE PREFERRED EMBODIMENT

Figure 1:
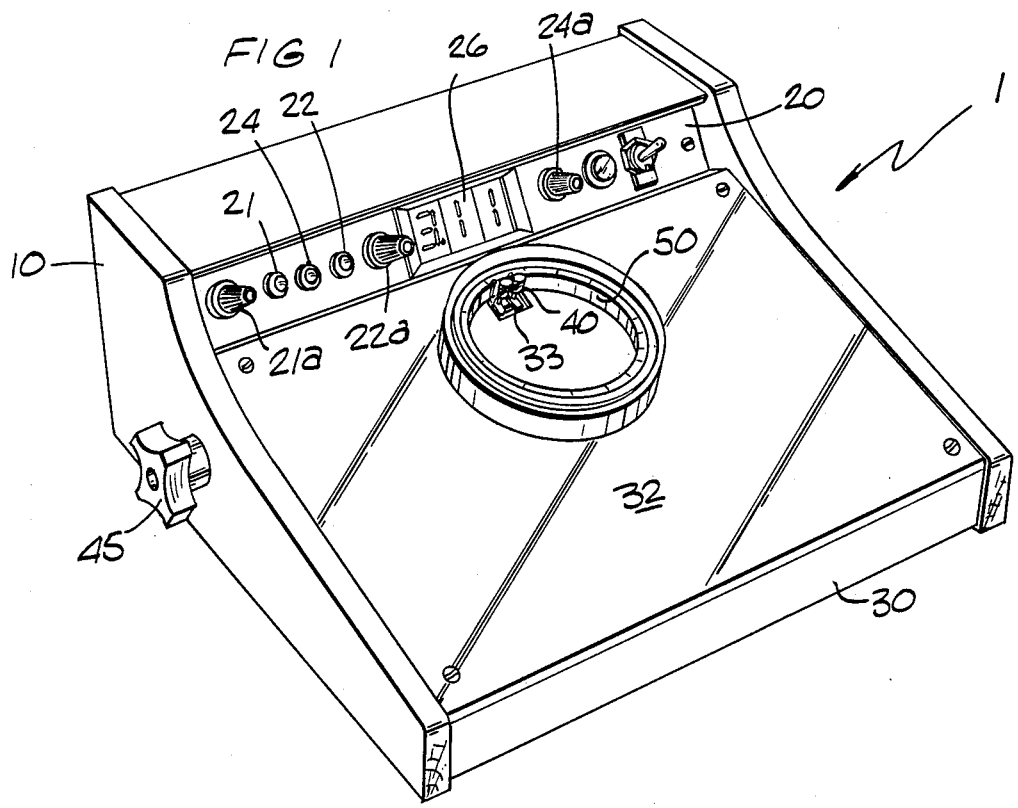
FIG. 1 is an overall view of a preferred embodiment of an instrument according to the subject invention.

Referring to the drawings, The device 1 comprises an instrument case 10. On the upper portion thereof is a control panel 20 which includes high and low tolerance limit lights 21 and 22 respectively with adjacent adjustment knobs 21a and 22a. There is a three numeral digital readout 26 located centrally of the panel 20. This readout is electrically connected to display deviation from some null or nominal diameter in the testing of an oil seal or the like. To the right thereof is a zero adjustment knob 24a which sets the conditions under which the digital readout and the zero (null) light 24 indicate that an exact nominal (in the case of the readout), or within tolerance (in the case of the indicator light 24), dimension has been detected.

Located below the control panel is a translucent plate 32 which forms a slanted work surface on which oil seals are tested as taught by this invention. Beneath this plate are positioned florescent lamps 34 (FIG. 2), together with the ballasts 36, lamp starters 38 and associated wiring, all of which makes up a light box.

Two pin supports 40 project through a hole 33 passing through the plate 32. A first one 42 of the pin supports is fixed, the other 44 of the pin supports is movable via a mechanical linkage when the test knob 45 is rotated.

A removable band gage 50 is shown (FIG. 1) lying on the face of the light box and mounted to the pin supports. This circular band gage is made of a hoop of thin spring steel shim stock and has a diameter when unstressed approximating the nominal inside diameter (i.d.) of the oil seal to be tested.

Figure 2:
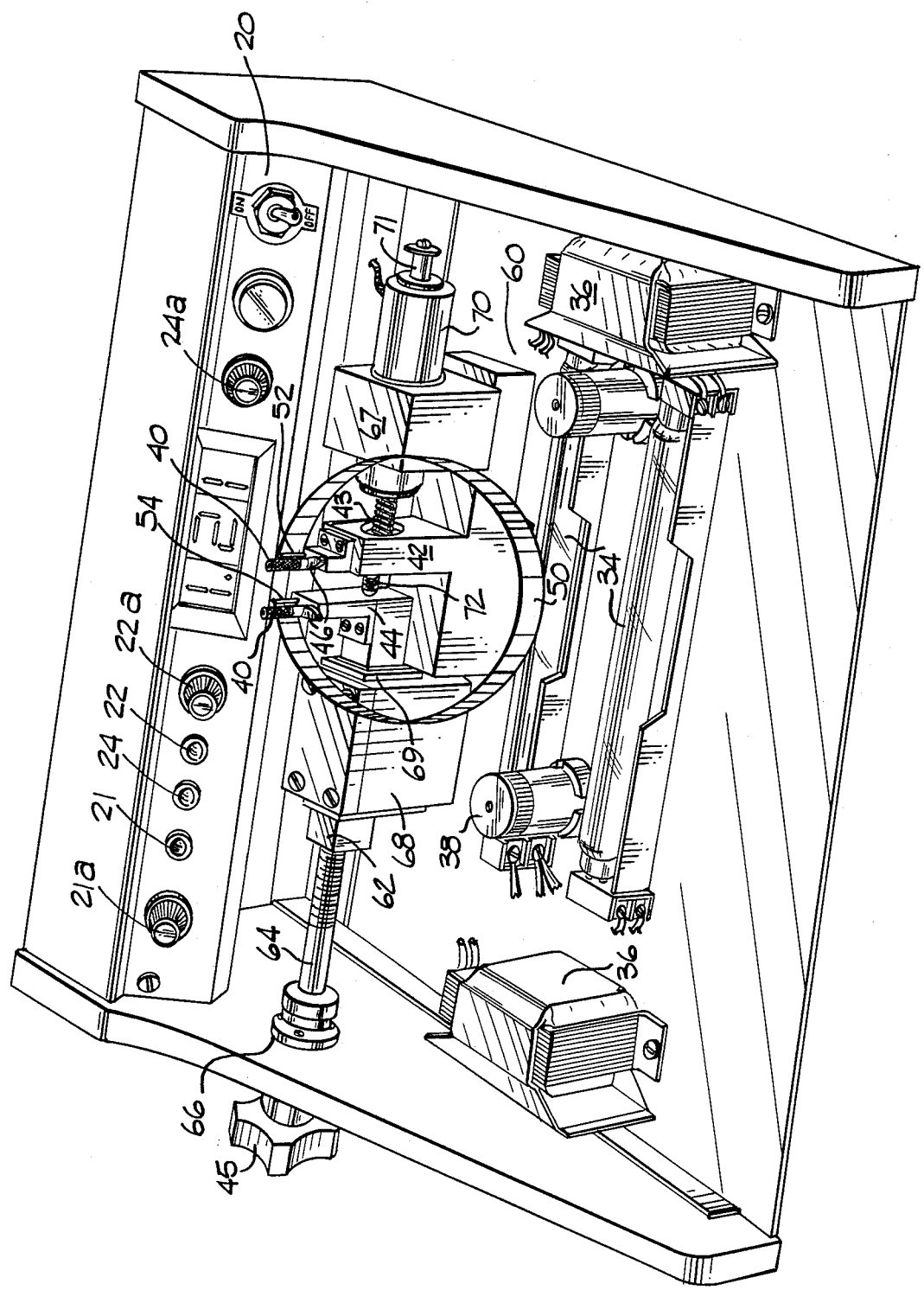
FIG. 2 shows the instrument with the front panel removed.

FIG. 2 shows the details of this band gage. The band gage has two ends spaced from one another. Pins 52 and 54 are fixed at these ends. They project down from the lower edge of the gage 50 to be received, respectively, in the pin supports 42 and 44. When pin support 44 is moved via slider 62, the band gage 50 is deflected to cause its circumference to change proportionally.

As discussed above, light boxes which are similar in construction to this one have been used to check the dimension and physical integrity of oil seals. This light box 30 is used in a similar manner as will be set forth as a means to signal when the o.d. of the band gage 50 equals the inside diameter of the the sealing surface of the oil seal or the like being tested.

Each of the pin supports 42 and 44 include a spring clamp, each of which has a spring loaded arm 46 (shown rotated away from pins 52 and 54) to hold the pins 52 and 54 on the ends of the band gage in their respective pin support. In this way, the band gage is held in position on the light box, yet can be removed easily and changed for a different size.

Both pin supports comprise upper projections of a slider unit 60 positioned below the translucent plate 32. a slider 62 mounted for precise longitudinal movement on the bearing suppport 68 is driven by threaded engagement with the threaded end of rotatable shaft 64. This shaft passes out of the case via shaft support 66. The test knob 45 is mounted on shaft 64 using compressible washers so that the knob slips on the shaft at a predetermined torque. This prevents placing too great a force on the slider unit 60 or the band gage 50 during calibration of the unit or an actual test.

When the shaft 64 is rotated by test knob 45, slider 62 is moved slowly and precisely via the great mechanical advantage provided by the threaded interengagement between the shaft 64 and the internally threaded slider 62. This movement is detected by sensor 70 mounted opposite to and in contact with the movable slider 62. While this detector could take many forms, it has been found that a linear variable displacement transformer (LVDT) is best suited.

An LVDT is an electromechanical transducer that produces an electrical output proportional to the displacement of a separate movable core. It consists of a primary coil and two secondary coils axially spaced on either side of the primary coil on a cylindrical form. A free moving rod-shaped core (not shown) inside the coil assembly provides a path for the magnetic flux linking the coils. When the primary coil is energized by an alternating current provided by the driver 84, voltage are induced in the secondary coils. These are connected in series with the terminals connected so that polarities of the induced alternating currents in each are opposed. Thus, the net output is the difference between these voltages, which is zero when the core is in the center or null position. Any deviation of the core from this null position produces a differential voltage output which varies linearly with the distance of deviation. The phase of the output changes abruptly by 180 when the core passes through the null position.

In an actual working model of the preferred embodiment, LVDT 70 is a model PCA-116-300 from Schaevits, U.S. Route 130 and Union Ave., Pennsauken, N.J. This unit is spring loaded so that the hardened steel probe 72 is constantly thrust against the opposing surface of the movable pin support 44. More particularly, the unit 70 includes a rod 71 which projects from either end of the cylindrical unit. The rod is mounted for sliding motion on nylon bearings. A compression spring is mounted between the rightmost bearing and an enlarged collar adjacent a hardened-steel probe 72. The LVDT requires an excitation frequency of between 50 and 10,000 Hz. The output of the secondary coils has a sensitivity equal to 1.2 (mV/volt input/0.001" deviation). This output is linear within 0.5% over a nominal range of movement of the probe 72 of 0.30".

It has been found desirable to mount the sensing unit 70 directly opposite of the screw shaft 64. This is accomplished by passing the probe 72 through an enlarged hole 43 in the non-moving pin support. In this way lost motion and slack is minimized, even as the bearing 69 begins to wear.

To the right of the fixed pin support 42 is the LVDT mount 67 which is made of a non-magnetic material such as a phenolic plastic or the like. This mount holds a LVDT unit in fixed, axial relationship relative to the movement of the movable pin support. This mount could of course be integrated into the fixed pin support to simplify the construction.

Figure 3A:
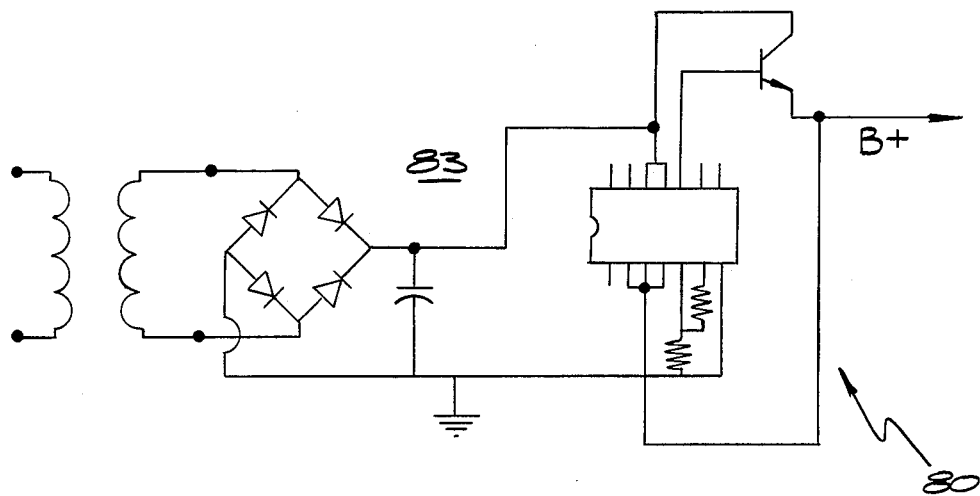
FIGS. 3 and 3A comprise a diagram of the electrical circuitry employed by the preferred embodiment.
Figure 3:
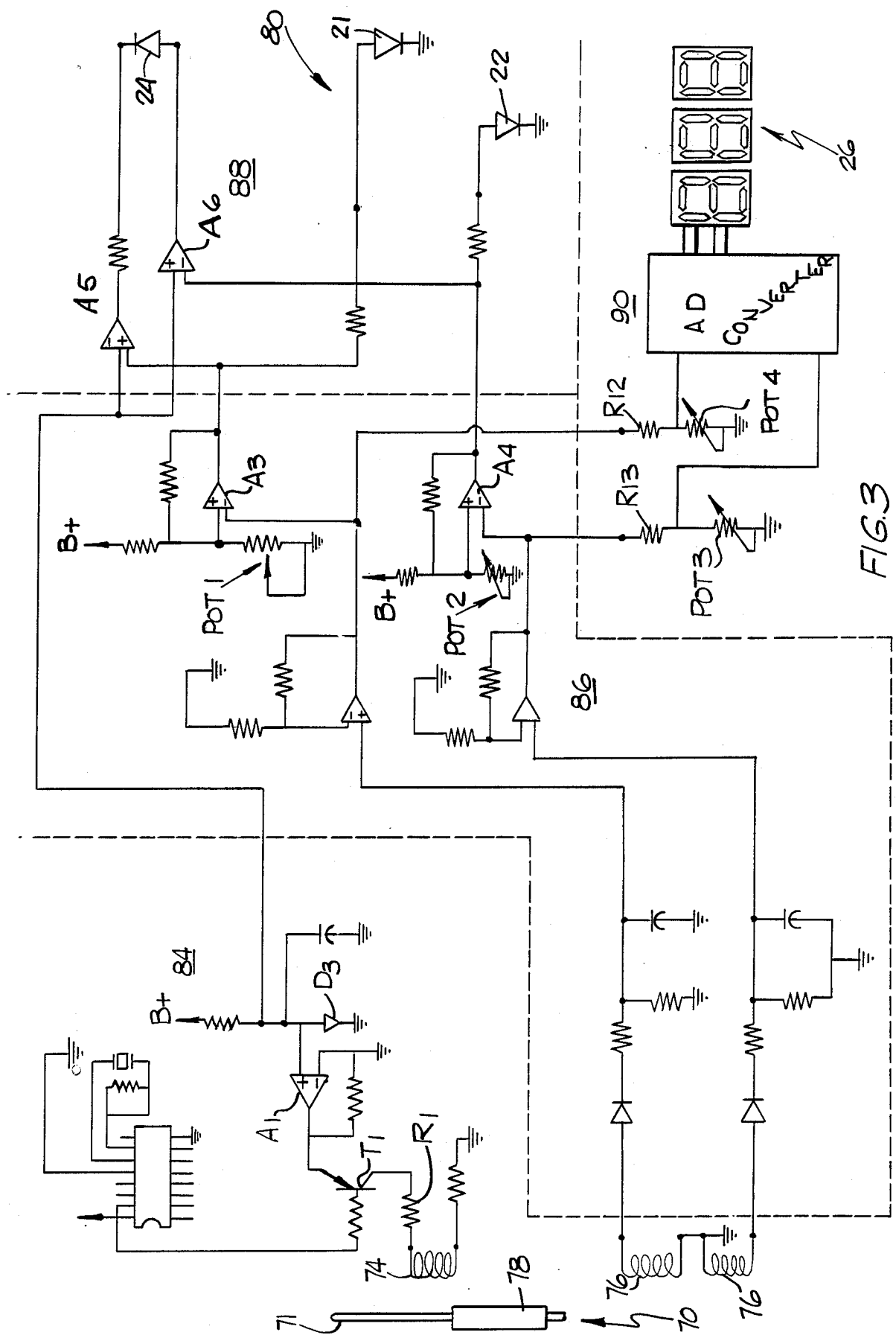

With reference to FIGS. 3 and 3A, the circuitry 80 for operating the LVDT comprises the power supply 83, the LVDT driver 84 which provides the alternating voltage for the LVDT primary coil, the receiver 86 which conditions and amplifies the voltage induced in the secondary coils, a comparitor circuit 88 for selectively operating the tolerance limit lights 21, 22, and nominal indicator light 24, and a scaling and driver circuit for operating the digital readout 26 via conventional a/d 90.

This circuitry operates in the following manner. The power supply provides rectified, filtered and regulated voltage B+ for the rest of the device. The LVDT driver comprises a conventional crystal controlled oscillator which provides a square wave signal via transistor T1 which is provided to one terminal of the LVDT primary coil 74 through current limiting resistor R1. While B+is regulated, it has been found desirable to insure that the amplitude of the excitation signal provided by the LVDT driver 84 is extremely constant. Thus, the voltage drop across back-biased diode D3 is amplified by the operational amplifier A1 and the output signal is provided to the emitter of T1.

The center leads of both secondary coils 76 and 76 of the LVDT are shorted to ground. Thus, the induced square wave signals from each of the secondary coils comprises a square wave signal whose average voltage fluctuated above ground depending on the position of the core 78 within the LVDT. Each of these signals is recitifed, filtered and amplified in conventional fashion by the receiver 86. The resulting d.c. signals are fed to the respective negative input terminals of a pair of operational amplifiers A3 and A4 which are each driven as switches by these relatively strong, amplified signals. The voltage at which the switching occurs is determined by the voltage presented to the respective plus input terminals of A3 and A4. This voltage is determined by pot 1 and pot 2 which are operated by the previously discussed adjustment knobs 21a and 22a respectively. The signal voltage at which the tolerance limit light 21 (which is preferably a yellow LED) is driven on by A1, and thus the position of the LVDT at which this voltage occurs can be adjusted by pot 1 operated by knob 21a. The same can be said for the relation between the operation of LED 22 and the adjustment of pot 2 via knob 22a.

The nominal indicator light 24 is preferably a green LED whose terminals are connected to the outputs of A3 and A4 via two more operational amplifiers A5 and A6 which are also operated as switches. The "on" condition of each tolerance limit light is detected by comparing the voltage of the output of A3 and A4 to a reference voltage derived from back biased diode D3. If either in "on", as indicated by a high voltage at the output of A3 or A4, the LED 24 is either back biased (i.e. LED 21 is on) or both terminals of 24 are at the same voltage (i.e. LED 22 is on). In either case, null indicator LED 24 will not light. Conversely, if 21 and 22 are not lit, 24 will be powered by the output of A6.

Thus when properly adjusted, the three LEDs 21, 22, and 24 can be used to rapidly show the three possible dimensional conditions that the circular part being tested can have, namely over tolerance (as determined by the adjustment of pot 22 by knob 22a), under tolerance (as determined by the adjustment of pot 21 by knob 21a) and within tolerance (as determined by neither LED being activated which results in LED 24 being turned on).

The above operation is aided by the provision of digital readout 26 as follows. The output signals from A1 and A2 are fed respectively to resistors R12 and R13. These signals are scaled relative to ground by POT3 and POT4. The difference between these scaled signals are fed to a conventional analog to digital converter which in turn drives three seven segment digital readout modules in a conventional manner. Thus, depending on the settings of these pots, the digital readout can be adjusted to correspond to any dimensional parameter of the circular part being tested which varies linearly with the movement of the the core of the LVDT and thus with the movement of the movable pin support 44. In the preferred embodiment, these potentiometers are set to provide a digital readout in 0.001 of an inch of diameter change. Other settings are possible. For example, they could be adjusted to provide a readout which corresponds to changes in circumference, or circumference in metric measure. It is contemplated that a multi-position switch could be provided to provide rapid changes in resistances to that the operator could rapidly choose between metric, English, diameter and circumference measurments.

To set up the instrument for testing a circular dimension of a part P, (such as the sealing surface of an oil seal or o-ring), a band gage having the correct nominal circumference is installed in the pin supports 42 and 44 using the spring clamps 46. The light box and measuring circuitry are activated and permitted to stabilize. A dimensional control standard, usually a machined steel ring having a known i.d. which is the same as the nominal diameter of the part P to be tested, is placed around the band gage and the test knob 45 is operated to expand the measuring band to provide a light seal, or in some cases a feel test is used to adjust the band to the standard. The slip mounting of the test knob on the shaft 64 assures that the band gage is expanded just enough to conform to the surface of the control standard. The digital readout is then adjusted to show zeros on all the positions. The standard is removed and the band expanded to the maximum permissible over-tolerance limit and the adjustment knob 22 is turned so the LED 22 just comes on. The same is done to cause the under-limit LED to just come on at the under-tolerance limit. The part to be tested is placed around the band and the test knob 45 is adjusted to just provide a light seal between the o.d. of the band and the i.d. of the seal i.e. when any gap between the smooth outer diameter of the band and the lip of the the seal is just closed. If the green in-tolerance LED 24 is lit then the sealing dimension passes inspection. If either of the other leds are lit, then the part is over or under the permissible size and the part is rejected.

It has been found that a relatively unskilled and inexperienced operator can quickly learn how to test parts using this instrument. The test results have remarkable repeatability, usually within 0.001" for a diameter test, even at a throughput rate of one such test every 5 seconds for sustained periods of time. It is felt that this remarkable repeatability is at least in part due to the fact that the point at which the light seal of the band to the tested part occurs is independent of the deflection characteristics of the circular part being tested. Thus the "feel" aspect of prior art testing methods is eliminated. Even relatively "soft" sealing components, such as knife edged oil shaft oil seals, O-rings of low durometer elastomers and the like can be tested with about the same repeatability as stiffer, more unyielding components.

Of course, other types of sealing components, and indeed any part having a substantially circular or even an oval portion which has a critical circumference or nominal diameter, can be quickly tested according to the instant invention. The band gage can conform to this slightly out-of-round portion and still give a quick and accurate measurement.

I claim:

1. A device for determining a dimension of a sealing member, said sealing member including a portion having a circumference dimension comprising
   an adjustable band having a smooth surface, means for positioning said band and said portion of said sealing member in proximity with one another whereby a gap is created therebetween, means for adjusting the effective circumference of said band whereby the gap between said surface of said band and said portion of said sealing member is just closed, means for determining the amount of said adjustment, and means for signalling when the effective circumference of the adjustable band is the same as the circumference of said portion of the sealing member.

2. A device as set forth in claim 1 wherein said adjustable band has two ends, and said ends are spaced from one another.

3. A device as set forth in claim 2 further including pins depending from said ends.

4. A device as set forth in claim 3 further includes means for connecting said pins to said means for determining the amount of said adjustment.

5. A device as set forth in claim 2 wherein said means for determining the amount of said adjustment includes means for detecting relative movement between said ends.

6. A device as set forth in claim 5 wherein said means for detecting relative movement between said ends further includes means for converting said relative movement into changes in diameter measurement.

7. A device as set forth in claim 6 wherein said means for determining the amount of said adjustment further includes means for displaying said diameter measurement.

8. A device as set forth in claim 1 wherein said means for determining the amount of said adjustment includes means for signalling whether said amount of said adjustment is more or less than a predetermined amount.

9. A device as set forth in claim 1 wherein said means for signalling is a lighting means.

10. A device as set forth in claim 9 wherein said lighting means is a light box.

* * * * *